United States Patent [19]

Von Bratt

[11] Patent Number: 4,854,018

[45] Date of Patent: Aug. 8, 1989

[54] CASKET LINERS

[76] Inventor: Marmaduke G. Von Bratt, 24 Claremont Terrace, Otumoetai, Tauranga, New Zealand

[21] Appl. No.: 70,073

[22] Filed: Jul. 6, 1987

[51] Int. Cl.$^4$ .................................... A01N 1/00

[52] U.S. Cl. .................................... 27/19; 27/2; 27/4

[58] Field of Search .................... 27/1, 3, 4, 19, 2, 5, 27/6, 7, 35

[56] References Cited

U.S. PATENT DOCUMENTS

| | | | |
|---|---|---|---|
| 703,934 | 7/1902 | Koeser | 27/4 |
| 748,692 | 1/1904 | Booth | 27/2 |

FOREIGN PATENT DOCUMENTS

| | | | |
|---|---|---|---|
| 232457 | 2/1961 | Australia | 27/3 UX |
| 2495 | of 1865 | United Kingdom | 27/2 UX |
| 209983 | 1/1924 | United Kingdom | 27/3 UX |

*Primary Examiner*—Robert A. Hafer
*Assistant Examiner*—Sam Rimell
*Attorney, Agent, or Firm*—Birch, Stewart, Kolasch & Birch

[57] ABSTRACT

A casket assembly including a liner arranged to nest securely within an outer casket. The casket is provided with releasable support means whereby in one mode the assembly can be raised with the liner supported within the casket and, in another mode, with the support means released, the casket can be removed from around the liner. The assembled peripheral wall may taper downwardly and inwardly to provide an open lower end of restrictive dimensions relative to the liner.

6 Claims, 4 Drawing Sheets

CASKET LINERS

The present invention relates to coffins and, in particular, is concerned with an inner liner and outer casket assembly particularly suitable for use with cremations or burials, the liner being used up or destroyed but the casket being reusable.

It is an object of the present invention to produce a combination outer casket and inner liner suitable for use with cremations or burials, the liner being consumed and the casket being available for reuse. Thus, a liner of relatively inexpensive and readily combustible or decomposable material can be used and a casekt of significantly more expensive construction and design is retained for reuse.

According to the present invention there is provided a casket assembly comprising an outer casket and a liner arranged to nest securely within the outer casket, the peripheral walls of which taper downwardly and inwardly to provide an open bottom of restrictive dimensions relative to the liner, the tapering configuration thus providing releasable support means for the inner line. In one mode, the assembly can be raised with the liner supported within the outer casket and in another mode, with the support means released, the outer casket can be removed from around the liner.

Preferably the walls are adapted to be opened in the outward direction to release the liner support, to permit the outer casekt to be removed from around the liner.

Preferably, inwardly directed lugs are formed about a lower extremity of the peripheral wall to provide additional support means.

The above gives a broad description of the present invention, a preferred form of which will now be described by way of example with reference to the accompanying drawings in which.

Figure 1:
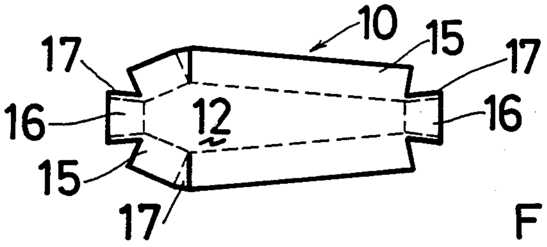
FIG. 1 is a plan view of a sheet of material for a casket liner for use in the present invention.
Figure 2:
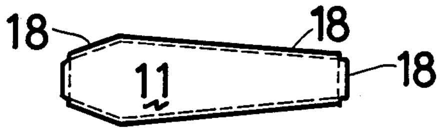
FIG. 2 is a plan view of a sheet of material for the lid of a casket liner of the present invention.

In each of the illustrated embodiments a liner 10 is fabricated from a semi-rigid cardbord or similar material preferably in a substantially conventional coffin shape but with one, rather than the conventional two, shoulder region defining corners. The liner 10 may be constructed in any suitable manner with, in the preferred embodiment, the liner typically being formed from single cardboard blank as shown in FIG. 1. Preferably a further single cardboard blank forms a lid 11 as depicted in FIG. 2 and the base section 12 is of corresponding shape with the base being marginally narrower than the lid.

Along each side of the base 12 there may be one, two, three or more side flaps 15, al extending to substantially the same distance from the main body of the base 12 itself, and arranged so that there are flaps 15 along the full length of each side. The number of flaps on each side depends on the particular shape of the desired coffin. These flaps 15 and end flaps 16 may have securing flaps 17 along their side edges.

Figure 3:
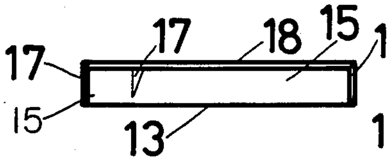
FIG. 3 is a side elevation of an assembled liner with a lid and depicted as attached to a base board.
Figure 4:
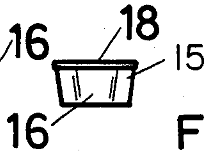
FIG. 4 is an end elevation of the liner of FIG. 3.

As depicted in FIG. 3 and 4 in assembly the flaps are folded to form an upright peripheral wall extending from the base and the liner is closed by the positioning of the lid 11 on the upper edges of the sides. The lid 11 incorporates marginal flaps 18 which can be fastened down over the upper edges of the upright wall. The joints between the flaps when they are folded up to form the upright walls may be strengthened by securing additional strips (not depicted) of material over them or by means of riveting, stapling or glueing.

Referring in particular to FIG. 4 as aforesaid, with the base 12 being narrower than the lid 11, the liner 10 is of a downwardly and inwardly tapering cross-section. The ends 16 too may be tapered, but vertical ends are also quite within the scope of the invention.

Figure 5:
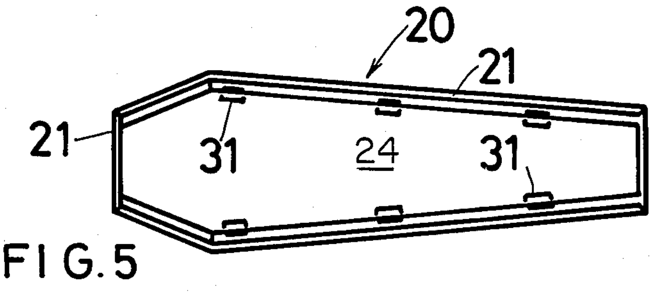
FIG. 5 is a plan view of a first form of outer casket depicted without a lid and showing the approximate positioning of the liner support lugs.

A first form of outer casket 20 (FIG. 5) is typically of substantially convetional configuration and, in particular, is shaped and dimensioned to match the liner 10 so that the liner 10 can nest securely within the casket 20. The outer casket 20 has a peripheral wall 21 formed in sections representing side and end panels in similar manner to the arrangement described above in respect of the liner. The wall sections may be detachably assembled together by any suitable interlocking means therebetween and by hinge arrangements with a lid 36 fitted thereto. The fitting of the lid then secures the collapsible assembly of the casekt into an essentially unitary form.

Figure 7:
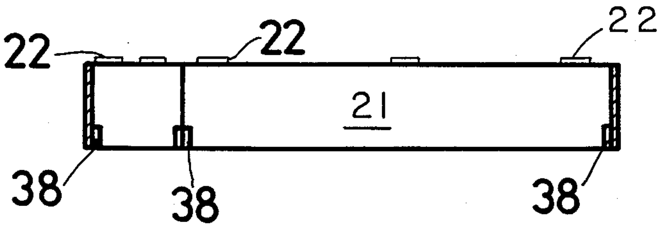
FIG. 7 is a side sectional view of FIG. 5 showing the positioning of hinges attaching sides to casket lid and location of side interlock and release means.
Figure 8:
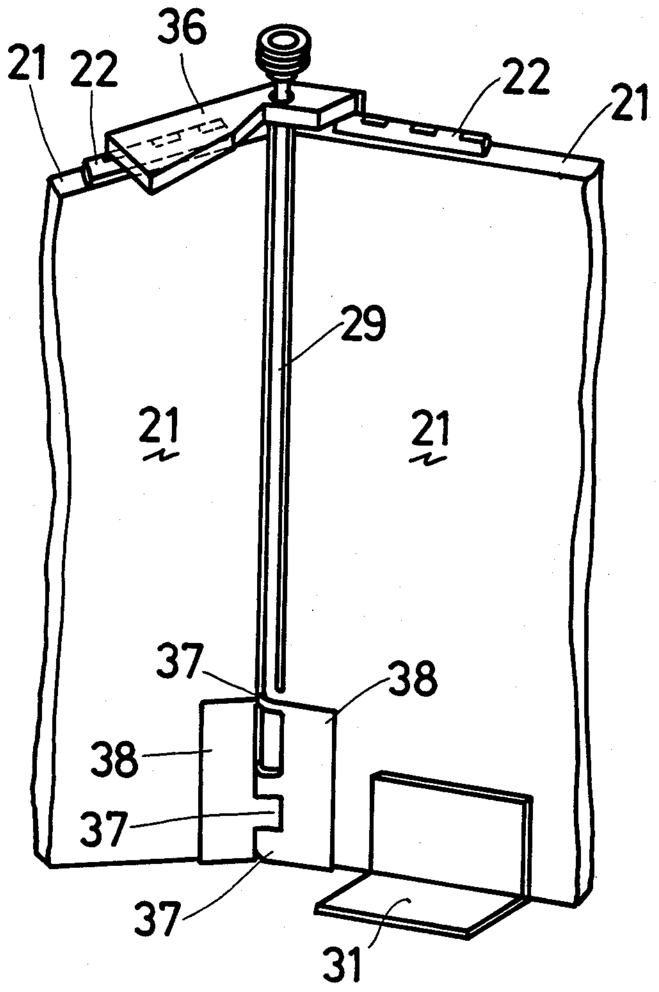
FIG. 8 is a fragmented view detailing the shoulder corner of the outer casket of FIG. 7 and depicting in particular the interlock release mechanism.
Figure 9:
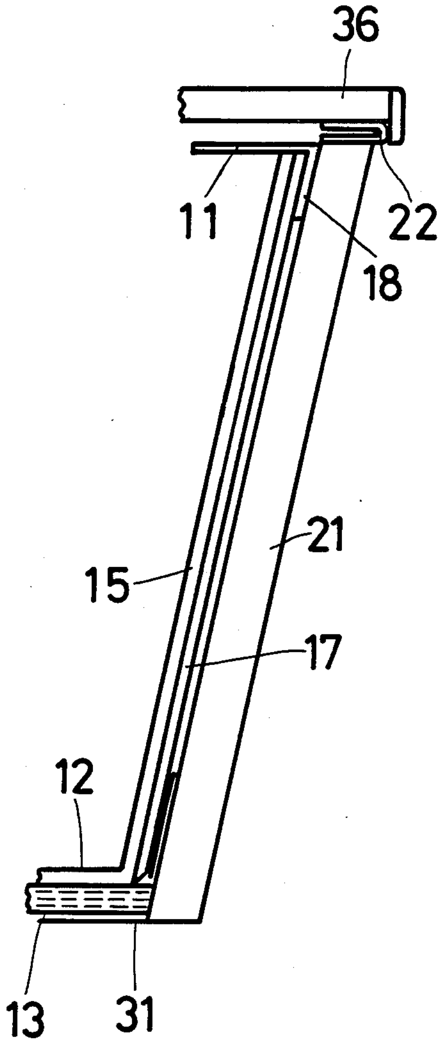
FIG. 9 is a sectional view of a hinged casket side detailing liner side flaps in relation to casket side and liner retainer supported by lugs where the sides are tapered.
Figure 10:
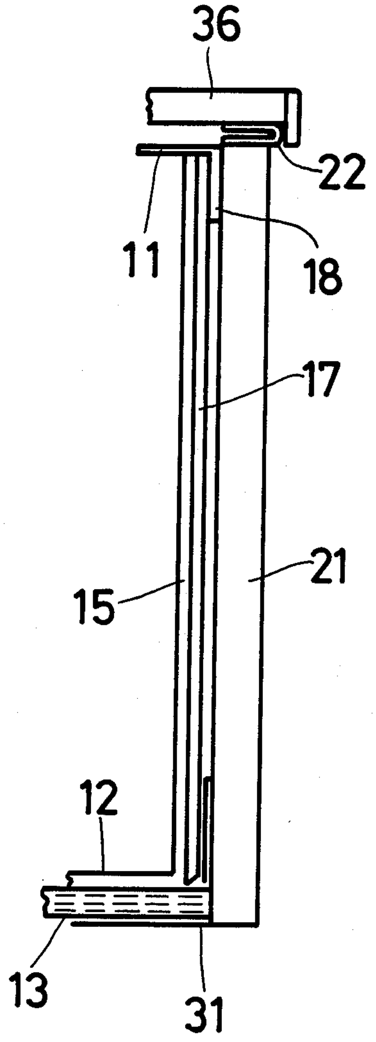
FIG. 10 is a sectional view as for FIG. 9 but with sides vertical.

Referring to FIG. 7 and 8 in particular for example, hinges 22 may be used along the upper edge of the casket wall, to join each panel of the wall 21 to the lid 36. The panels of the wall are interlocked together at the adjoining edges. Preferably the interlock means comprise tubular lugs 37 mounted by plates 38 mounted to the inner faces of the wall panels 21. The lugs 37 overlap one another to align the bores enabling a release pin 29 to locate therein. Pin 29 is mounted for axial movement within the lugs to enable withdrawal thereof. Preferably pins 29 extend through the lid 36 to enable their operation from above.

Figure 6:
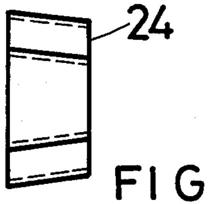
FIG. 6 is an end view of casket FIG. 5.

As depicted in FIG. 6 preferably the peripheral wall of the outer casket 20 tapers outwardly and inwardly to terminate with an open bottom 24 forming a restricted opening, too small for the liner 10 to fit through. The tapering thus provides a support means for the liner when the casket and the liner are raised as an assembly.

When it is desired to remove the casket 20 from around the liner 10, the sections of wall 21 are released to swing out pivoting about their upper edges that is about the hinges 22, after the pins 29 have been released. The casket can then be lifted away from the liner.

In addition or as an alternative, outer casket 20 is provided with inwardly projecting lugs 31 provided about a lower edge of the outer casket peripheral wall to provide support beneath a casket outer liner nesting therein. The use of lugs 31 enables an upright walled casket liner to be utilised, the lugs supporting the liner within the casket.

Figure 11:
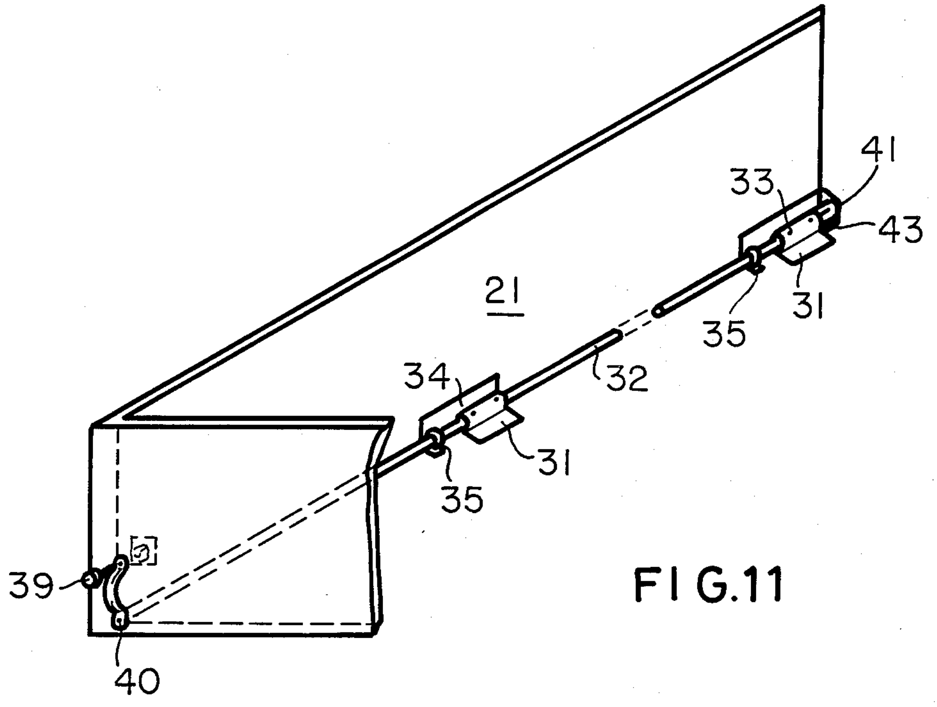
FIG. 11 is a trunkated perspective view detailing the liner release mechanism of a casket with fixed vertical sides. The release screw is at the foot end and the mechanism ends at the shoulder.
Figure 12:
FIG. 12 is a simple end view of the mechanism in FIG. 11 only showing the retaining bracket and pipe section to which lug is welded.
Figure 13:
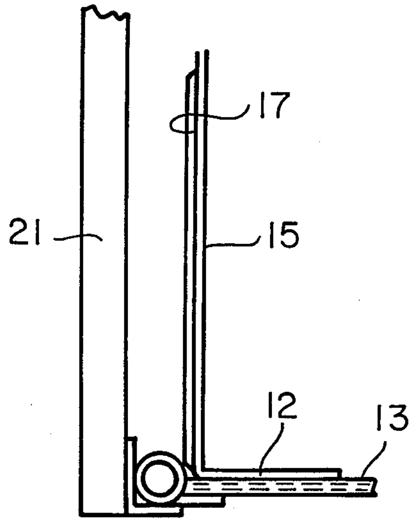
FIG. 13 is a sectional view of FIGS. 11 and 12 giving the position of the liner and liner support in relation to the casket side.

Referring to FIG. 11, in an alternative embodiment outer casket 20 is provided with inwardly projecting lugs 31 mounted on rotatable shafts 32 held in place by means of pins or grub screws 33 so that the lugs hold the liner securely within the casket. Brackets 34 hold the shaft mounting to the casket walls. Pipe bushes 35 welded to bracket 34 hold the mechanism together. Shafts 32 extend along the lower edge of each long side panel of wall 21 and through the associated end panel of wall 21. A release screw 39 and linkage 40 are attached thereto. At the opposite end each shaft 32 locates in a bush 41 incorporating an elongate slot in which a projecting pin 43 on shaft 32 is located. By operating the release screw 39 shaft 32 can be withdrawn from its associated bush 41 and can thus rotate allowing the lugs 31 to fall away from beneath an inner liner. The outer casket can then be removed and the inner casket containing the body cremated or covered with soil as the case may be.

The brackets may extend substantially the full length of the sides, or they may be relatively short, as shown and as many lugs incorporated as needed.

In this case, the side walls of the outer casket and/or the liner may be vertical, as the inward taper of the walls is no longer being relied upon to hold the liner in place within the outer casket.

Various modifications to the above may be made without departing from the scope of the present invention as broadly defined or envisaged. For example, various different mechanisms for holding the inner casket within the outer casket may be used, apart from those described above.

The inner liner may be formed of a single sheet of material or it may comprise several pieces joined together in any suitable manner. If desired, the floor of the liner may be of sturdier material than the side walls, to guard against premature break-out of the body from the outer casket.

Referring to FIG. 3 in particular a liner formed from a single sheet as depicted in FIG. 1 may be attached to a base board of timber 13 to provide additional strength. The provision of the base board will provide sufficient support to avoid the need of lugs 31 in the zone of the outer casket 20 between the shoulder and the associated end of the outer casket. A similar approach may also be provided near the foot end. The liner may take the form of any suitable inexpensive container, able to be held with the outer casket until its release.

Thus, in use an outer casket and liner can be presented in a conventional manner without its being particularly apparent that a conventional casket is not being used. When required, the outer casket can be detached from the liner for reuse.

What I claim is:

1. A casket assembly comprising an outer casket and a liner arranged to nest securely within said outer casket, the peripheral walls of said outer casket, being tapered downwardly and inwardly and provide an open bottom area of cross section less than the top area of cross section of the liner, thus providing support therefor, whereby the assembly can be raised with the liner supported within the outer casket and means for release, of the liner support whereby the outer casket can be removed from around the liner.

2. The casket assembly as claimed in claim 1, wherein inwardly directed lugs are formed about a lower extremity of the peripheral wall to provide additional support means.

3. The casket assembly as claimed in claim 2, wherein the lugs are arranged to be rotatable to release the support, and to permit the outer casket to be removed from around the liner.

4. The casket assembly as claimed in claim 3, wherein the lugs are releasably held against rotation by pins or screws.

5. The casket assembly as claimed in claim 1, wherein the walls are adapted to be opened out to release the liner support, to permit the outer casket to be removed from around the liner.

6. A casket assembly as claimed in claim 5, wherein inwardly directed lugs are formed about a lower extremity of the peripheral wall to provide additional support means.

* * * * *